Oct. 30, 1951     A. A. BEAUMARIAGE ET AL     2,573,300
GLASS-FORMING APPARATUS

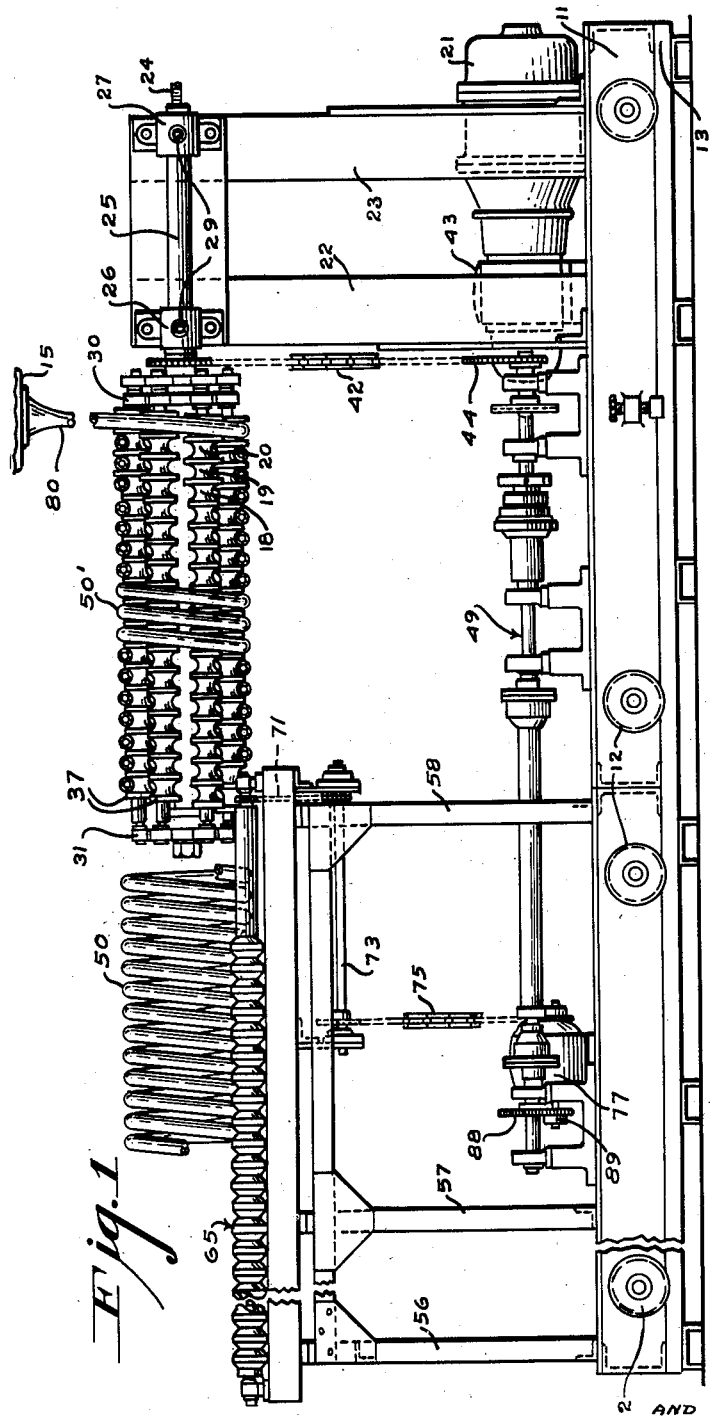

Filed May 10, 1946     2 SHEETS—SHEET 2

Inventors
AMOS A. BEAUMARIAGE,
STUART M. DOCKERTY
AND WILLIAM R. WISNER

By Knight & Fowler
Attorneys

UNITED STATES PATENT OFFICE 2,573,300

GLASS FORMING APPARATUS

Amos Alphonse Beaumariage, Central Falls, and William Roy Wisner, Pawtucket, R. I., and Stuart M. Dockerty, Corning, N. Y., assignors to Corning Glass Works, Corning, N. Y., a corporation of New York Application May 10, 1946, Serial No. 668,902

3 Claims. (Cl. 49—7)

The present invention relates to glass forming apparatus and particularly to apparatus suitable for the quantity production of spirally wound glass stock, such as rods and tubing or the like, into helices.

The prime object of the present invention is a form of apparatus especially suitable for the continuous economical production of helices of tubular material suitable for use as envelopes of circular fluorescent lamps.

In the accompanying drawings—

Fig. 1 is a side elevation of a machine embodying the invention associated with the bottom outlet of a tube forming machine and showing tubing being formed into a helix thereby. For the sake of clearness, part of the helix being formed has been shown broken away.

Fig. 2 is an enlarged view partly in section of a fragment of Fig. 1.

Fig. 3 is a sectional view taken on line 3—3 of Fig. 2, plus the showing of auxiliary rolls.

Figure 4:
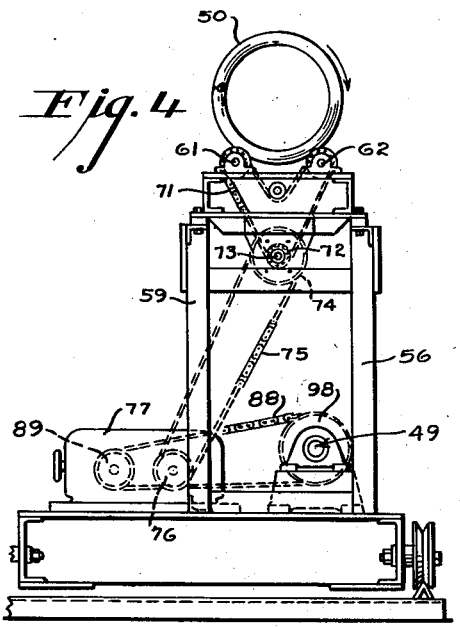
Figs. 4 and 5 are end elevations of the machine.

Referring to the drawings in detail, the machine is in the form of a carriage having a bed 11 supported on wheels 12 arranged on rails 13 and 14 for ease of adjustment of the machine relative to a tubing machine outlet 15. On the one end of bed 11 is a drive motor 21 and uprights 22 and 23 for supporting the winding equipment. This equipment is carried by a tubular mandrel 25 held in clamping blocks 26 and 27 and locked in the desired adjusted position by set screws 29. The mandrel 25 has fixed thereto a pair of bearing supporting plates 30 and 31 having equally spaced about their periphery bearing blocks 32′ and 32 respectively. Each pair of blocks 32—32′ carries a roller supporting shaft 36 having keyed thereon or integral therewith in the space between its bearing blocks 32—32′ a grooved roller 37 adapted to be rotated by a pinion 38 carried by a portion of the shaft projecting through its block 32′. One roller 37 is so located on its supporting shaft 36 as to have an end groove in substantial alignment with approaching tubing, whereas the remaining rollers 37 are slightly displaced axially progressively greater distances leftward (as viewed in Fig. 1) on their supporting shafts 36. Also, as indicated in Fig. 2 by arrows A and B, shafts 36 are skewed with respect to the axis of the mandrel 25 to bring the respective roller grooves into positions in which they collectively form a path for the winding of the tubing to spiral form. Additionally, to work the glass and hold it to a desired cross section, grooves 18, 19 and 20 of each roller have confining side walls giving the grooves an effective depth approaching the diameter of the material to be wound. Also the cross sections of grooves 20, 19 and 18 are progressively slightly smaller. For example, with the grooves to the left of grooves 18, 19 and 20 of three-fourths inch radii, the radii of grooves 18, 19 and 20 would be approximately thirteen-sixteenths, seven-eighths and fifteen-sixteenths inches, respectively.

Cooling of the glass spiral turns to a set condition as they progress along the length of mandrel 25 is accelerated by providing the mandrel with a plurality of nozzles 60 spirally arranged along the length of the mandrel and directed toward the path of travel of the glass. Air is supplied to the mandrel bore at 24.

Figure 5:
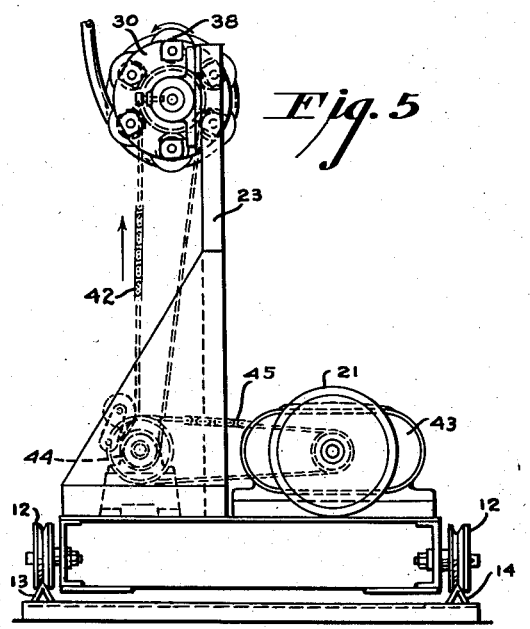
Figure 6:
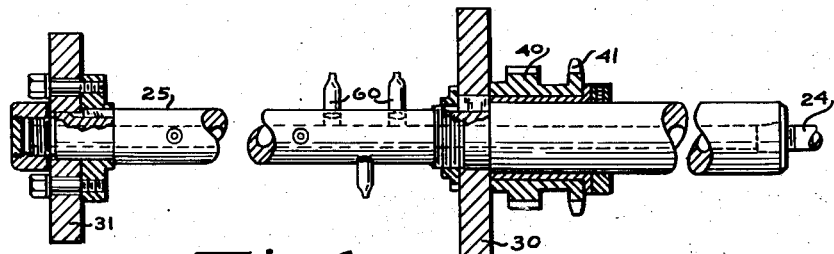
Fig. 6 is an enlarged view, partly in section of the mandrel and associated parts supporting the winding apparatus.

The pinions 38 (Figs. 2 and 3) of the respective shafts 36 are in mesh with a drive gear 40 rotatable on a bearing carried by mandrel 25 (Fig. 6). Gear 40 is integral with a sprocket wheel 41 driven by a chain 42. The drive of chain 42 is off a sprocket wheel 44 carried by a shaft assembly generally designated 49 whose drive is through a chain 45 (Fig. 5) from a reduction unit 43 driven by motor 21.

Figure 7:
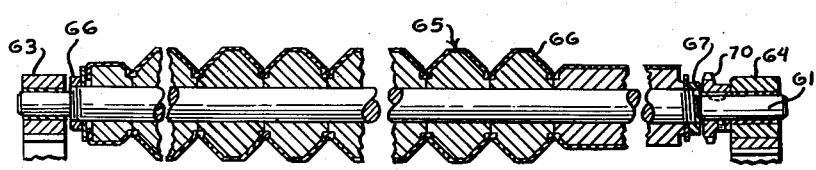
Fig. 7 is a sectional view of a take-off shaft and roller assembly and fragments of its supports.

Arranged to receive a formed helix 50 is a coil take-off assembly supported by a number of uprights 56, 57, 58 and 59 of which are shown. The take-off assembly comprises shafts 61 and 62 (Figs. 4 and 7), each mounted in suitable bearings 63 and 64 and each provided with a grooved roller assembly generally designated 65, preferably covered with asbestos 66 or the like to protect the tubing against undue abrasive action. Each assembly 65 is arranged in fixed relation to its shaft 61 or 62 in any desired manner, as by being held between nuts 66 and 67, and is adapted for rotation by a sprocket wheel 70 keyed to the shaft. The shafts 61 and 62 are rotated by a chain 71 passing about their sprocket wheels and a sprocket wheel 72 carried by a counter shaft 73. The shaft 73 in turn receives its drive through a sprocket wheel 74 and a chain 75 driven by a sprocket wheel 76 of a speed change assembly 77 driven by a chain 88 extending about a sprocket wheel 89 of assembly 77 and a sprocket wheel 98 carried by drive shaft assembly 49.

Operation

When the winding operation is to be initiated the machine is so oriented with respect to a stream of plastic glass tubing or rod 80, as the case may be, that the plastic glass can be manually wound about the first grooves of the respective rollers as they are being rotated about their respective axes. After manual aid in attaining a few turns of the spiral, sufficient traction is developed for the winding to continue solely through the rotating action of the respective roller units. The spiral of glass so produced rapidly advances the length of the roller units and its free end becomes supported by the take-off rollers from which segments may conveniently be cracked off in a conventional manner as the process continues. The glass, being extremely plastic in the initial stages of the winding operation, tends to flatten somewhat as it makes its first turn about grooves 20 of the respective roller units. The drawing of the tubing into grooves 19 and 18 of successively smaller cross-section, however, forces the glass into circular contour before it becomes rigidly set by natural cooling assisted by air directed against it by nozzles 60. It is desirable to rotate roller assemblies 65 at a speed at which the surfaces engaging glass exert a pull thereon to aid in keeping the glass taut and hence in good frictional engagement with the rollers 37. As an alternative, or to supplement the action of rollers 65 in holding the glass relatively tightly wound about the roller assembly, one or more plain surfaced rolls, such as the rolls 90 and 91 (Fig. 3), may be arranged in frictional engagement with a section of the glass spiral, section 50' for example, and also rotated at a slightly higher surface speed than that of the engaged surface of the spiral.

We claim:

1. In combination, an elongated tubular member, a plurality of rotative members arranged in a row substantially concentric to the axis of the bore of said member and having their own axes angularly disposed with respect to the bore of said first member, nozzles extending from side openings in said first member directed toward spaces between said rotative members, and means for connectnig the bore of said tubular member with a fluid supply line.

2. In an apparatus for winding a linear body into spiral form, an assembly supported in a horizontal plane solely from one end containing rollers having grooves affording a spiral path from the supported to the unsupported end of said assembly, means for driving said rollers about their own axes to wind a thermo-plastic linear body in workable condition thereabout and to advance the body in set helical form off the unsupported end of the assembly, take-off rollers arranged in a position relative to the unsupported end of said assembly to support the set portion of the body coextensively with any unset portion thereof wound about said assembly, and means for rotating said take-off rollers about their respective axes.

3. In an apparatus for winding a linear body into spiral form, an assembly supported in a horizontal plane containing a circular row of rollers having grooves affording a spiral path from one end of the assembly to the other, means for driving said rollers about their own axes to wind a thermo-plastic linear body in workable condition about one end of the rollers of the assembly and to advance the body in set helical form off the opposite end of the rollers of the assembly, and rotatable take-off rollers arranged in a position relative to the end of said assembly off which the body is advanced to support such portion of the body coextensively with any unset portion thereof wound about said assembly.

AMOS ALPHONSE BEAUMARIAGE.
WILLIAM ROY WISNER.
STUART M. DOCKERTY.

REFERENCES CITED

The following references are of record in the file of this patent:

UNITED STATES PATENTS

| Number | Name | Date |
|---|---|---|
| 250,528 | Hayden | Dec. 6, 1881 |
| 809,413 | Weaver | Jan. 9, 1906 |
| 1,604,133 | Rebechini | Oct. 26, 1926 |
| 1,847,161 | Alden | Mar. 1, 1932 |
| 1,920,224 | Weaver | Aug. 1, 1933 |
| 2,002,996 | Hoefinghoff et al. | May 28, 1935 |
| 2,136,386 | Kline | Nov. 15, 1938 |
| 2,165,259 | Helm | July 11, 1939 |
| 2,239,055 | Sawyer | Apr. 22, 1941 |
| 2,352,868 | Tarbox | July 4, 1944 |
| 2,365,096 | Mothwurf | Dec. 12, 1944 |
| 2,388,401 | Freundlich | Nov. 6, 1945 |
| 2,389,878 | Symmes | Nov. 27, 1945 |
| 2,424,490 | Henry | July 22, 1947 |
| 2,462,808 | Danner | Feb. 22, 1949 |

FOREIGN PATENTS

| Number | Country | Date |
|---|---|---|
| 366,328 | Great Britain | Feb. 4, 1932 |
| 539,200 | Great Britain | Sept. 1, 1941 |